A. W. RANGER.
TYPE SETTING AND DISTRIBUTING MACHINE.
APPLICATION FILED DEC. 13, 1913.
1,103,013.
Patented July 7, 1914.
10 SHEETS—SHEET 1.
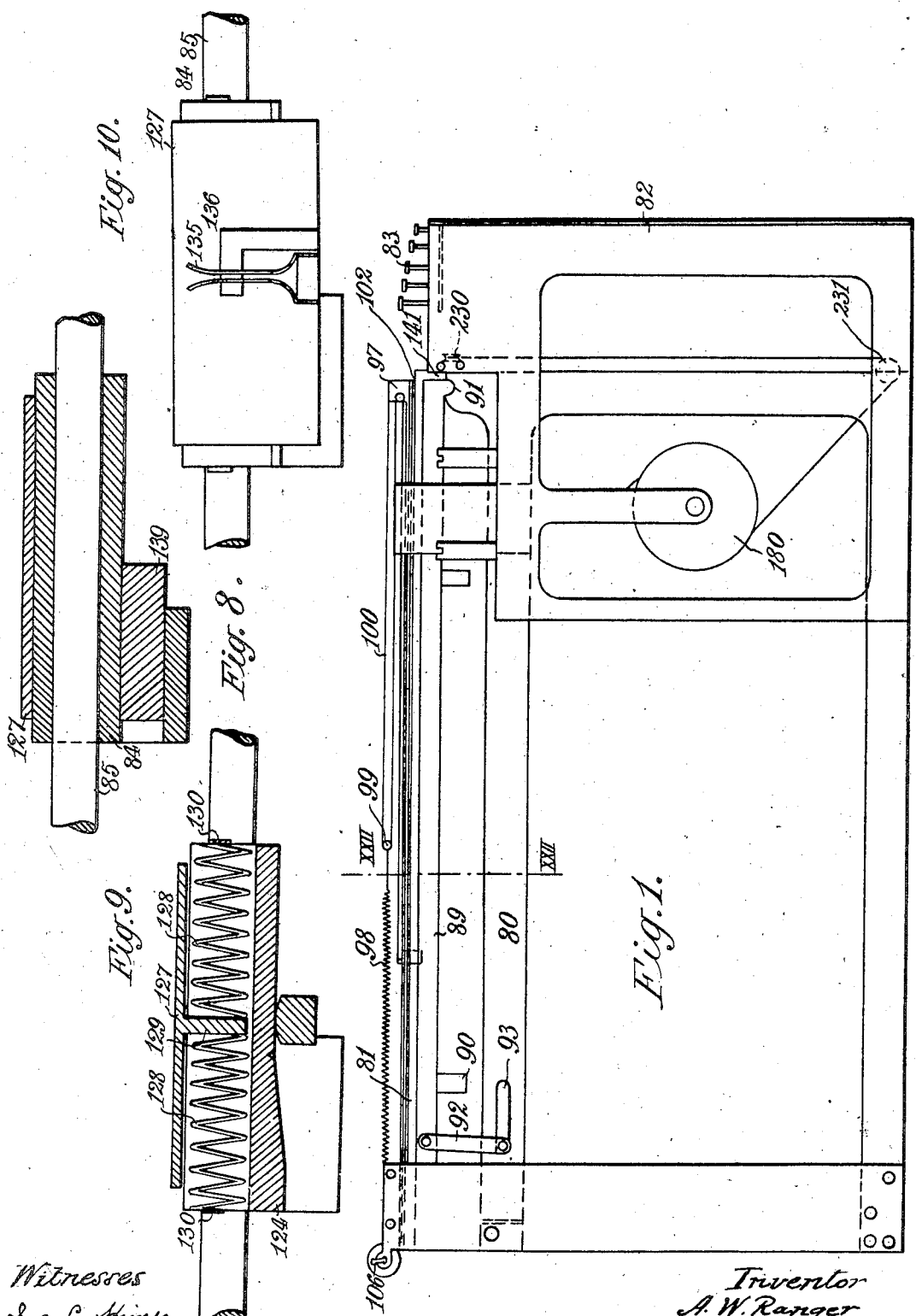

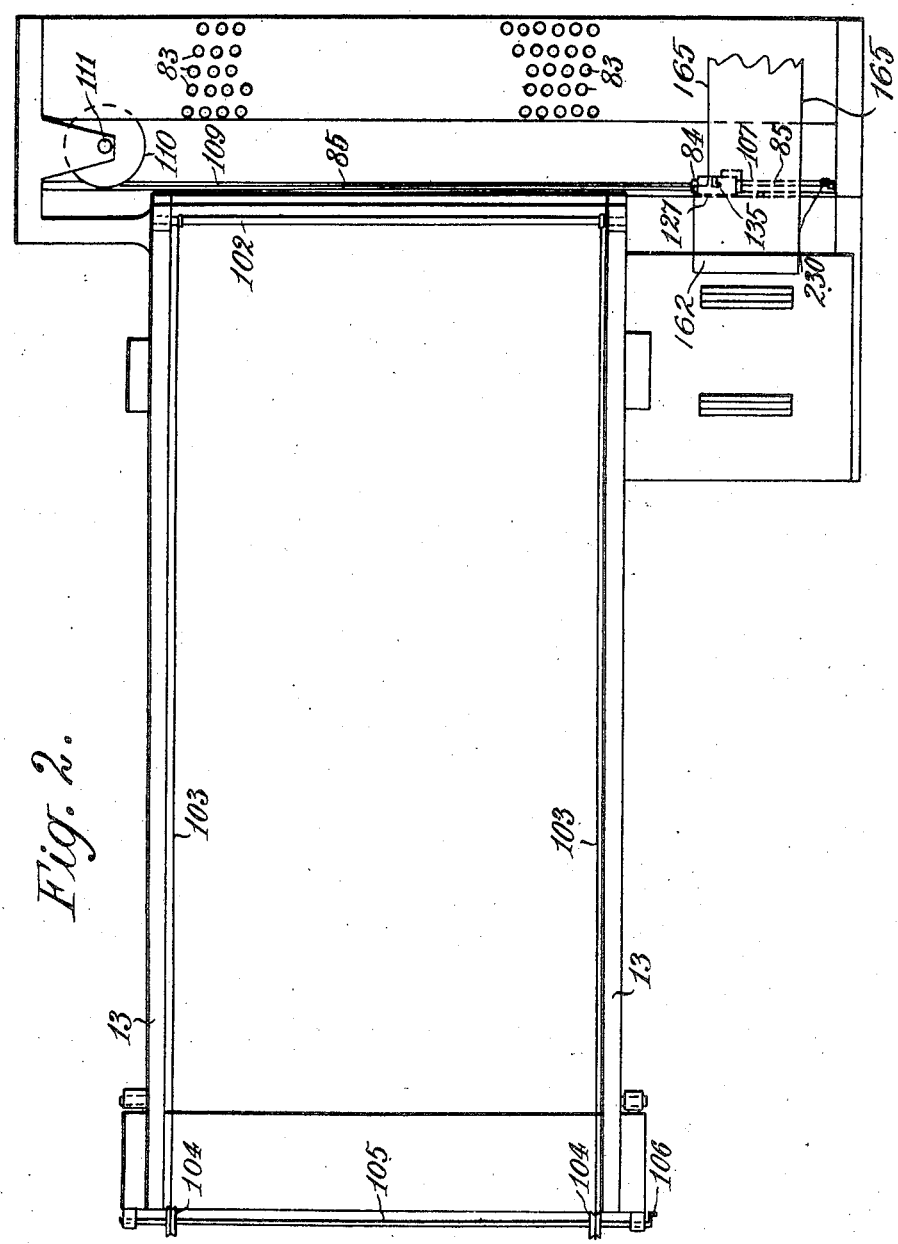

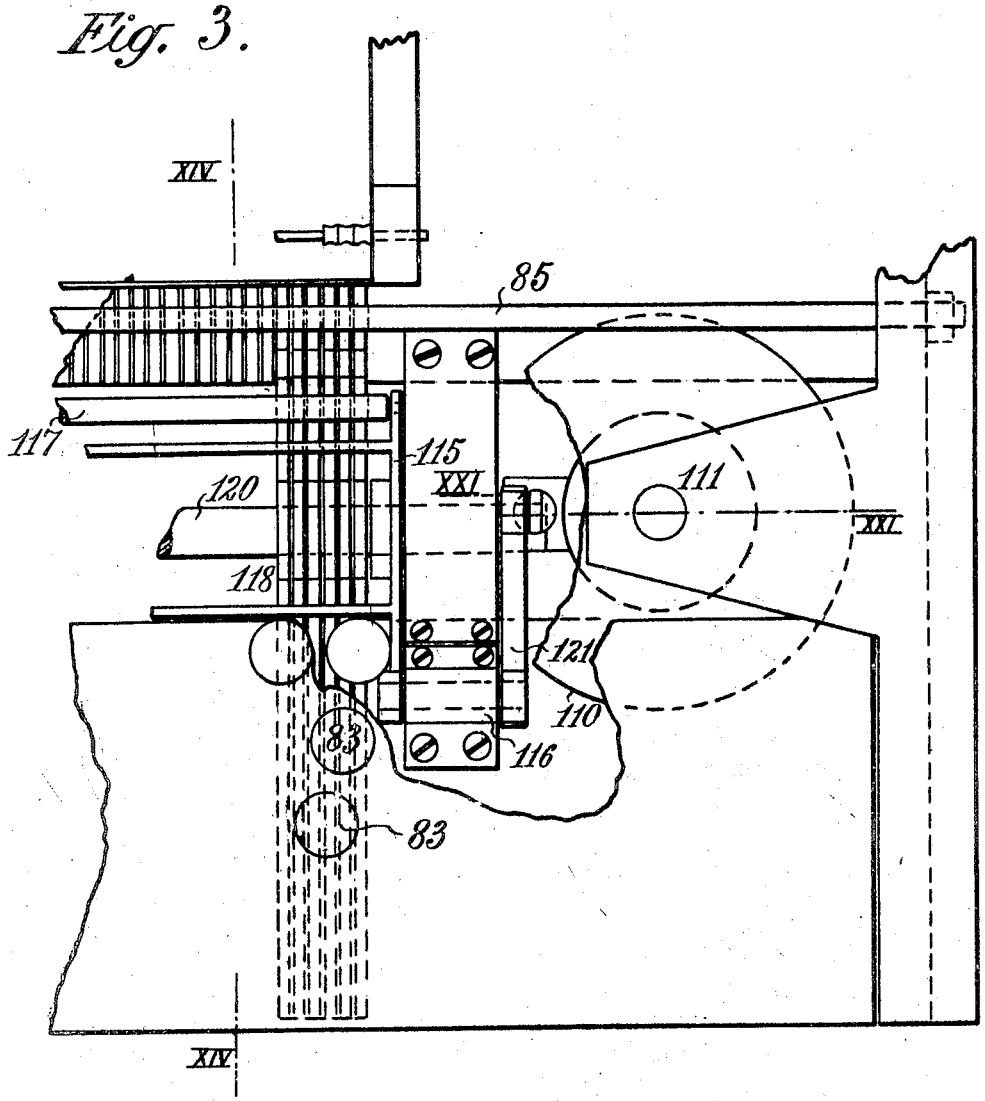

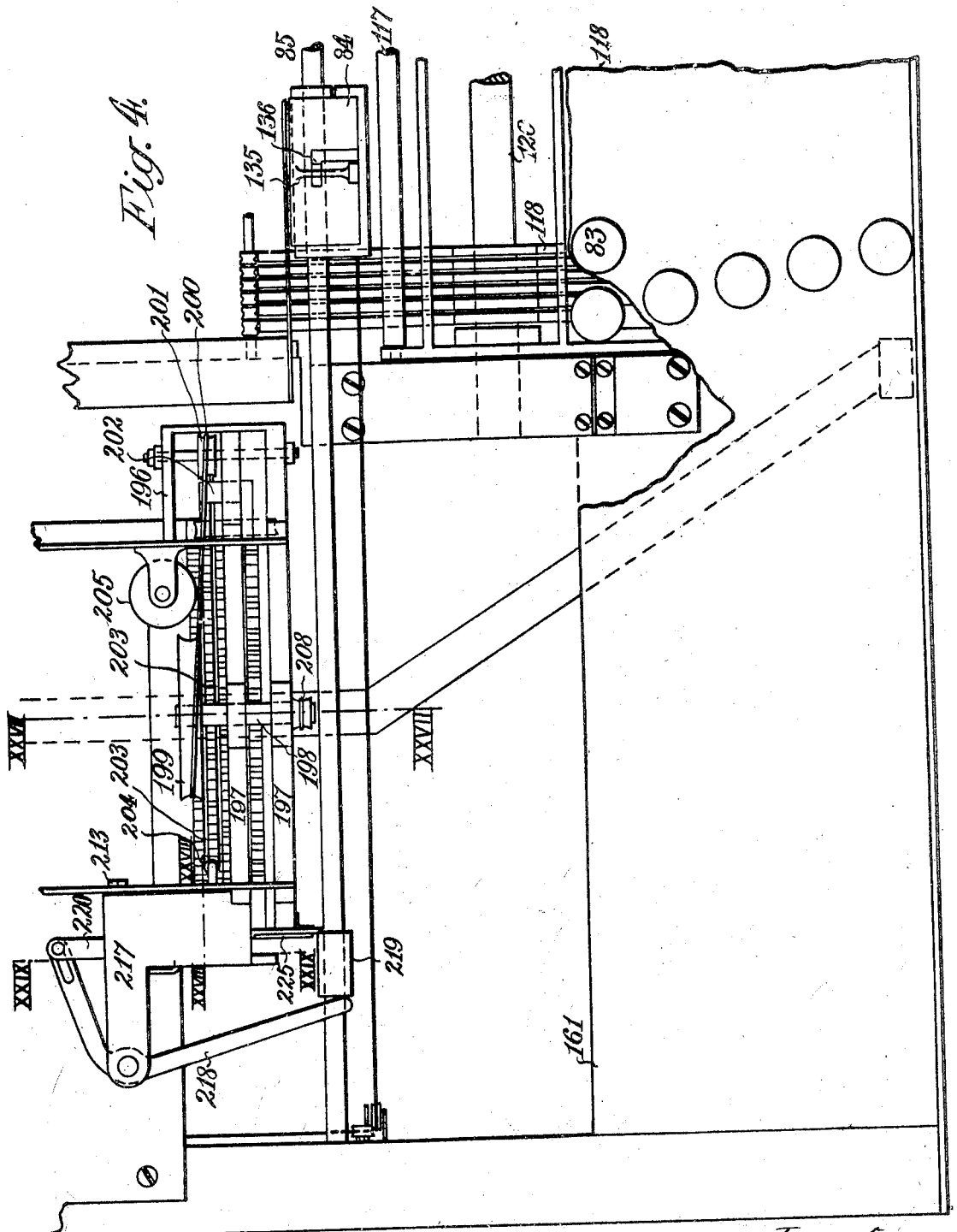

A. W. RANGER.
TYPE SETTING AND DISTRIBUTING MACHINE.
APPLICATION FILED DEC. 13, 1913.
1,103,013.
Patented July 7, 1914.
10 SHEETS—SHEET 6.
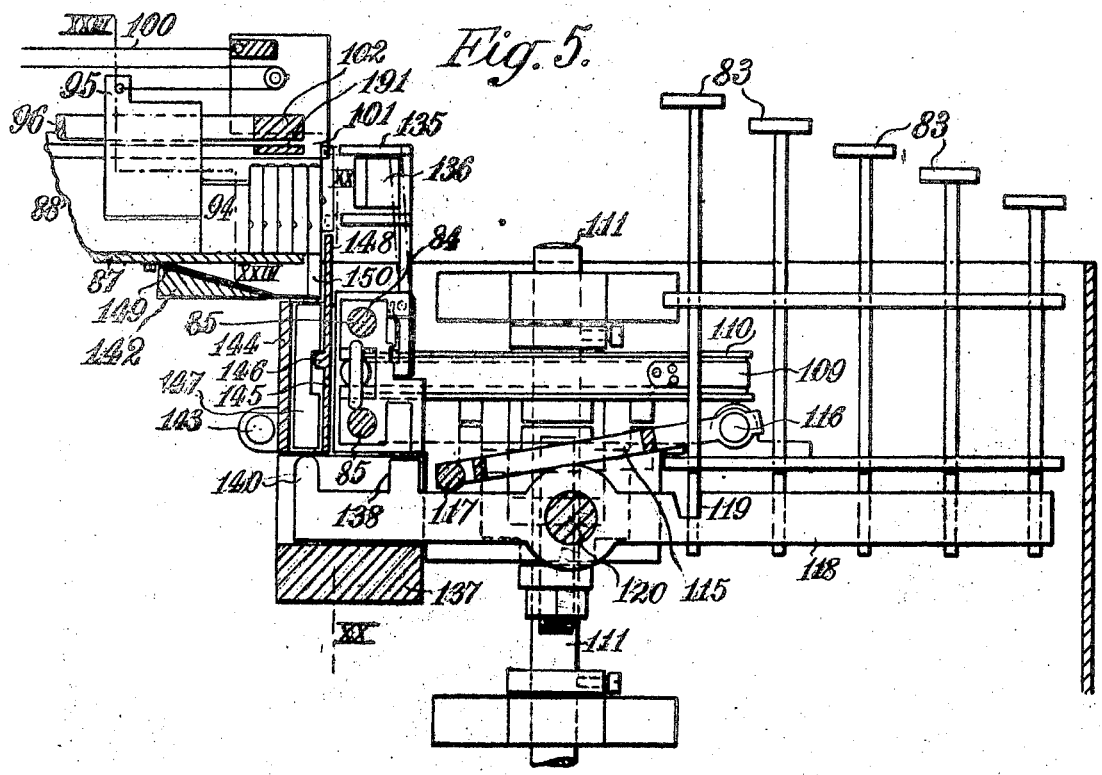
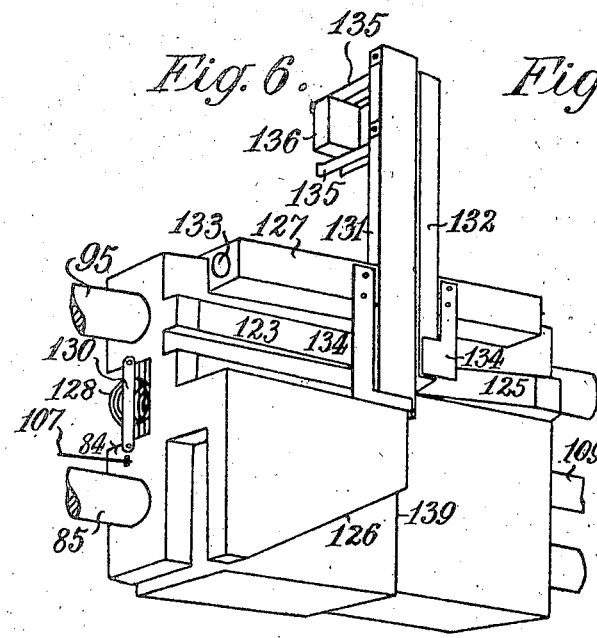
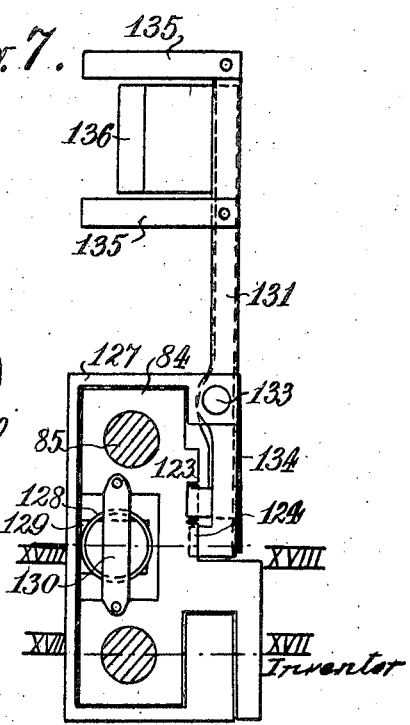
Witnesses
Ira P. Hines
R. E. Marshall
Inventor
A. W. Ranger
by Connolly Bros.
Attorneys A. W. RANGER.
TYPE SETTING AND DISTRIBUTING MACHINE.
APPLICATION FILED DEC. 13, 1913.
1,103,013.
Patented July 7, 1914.
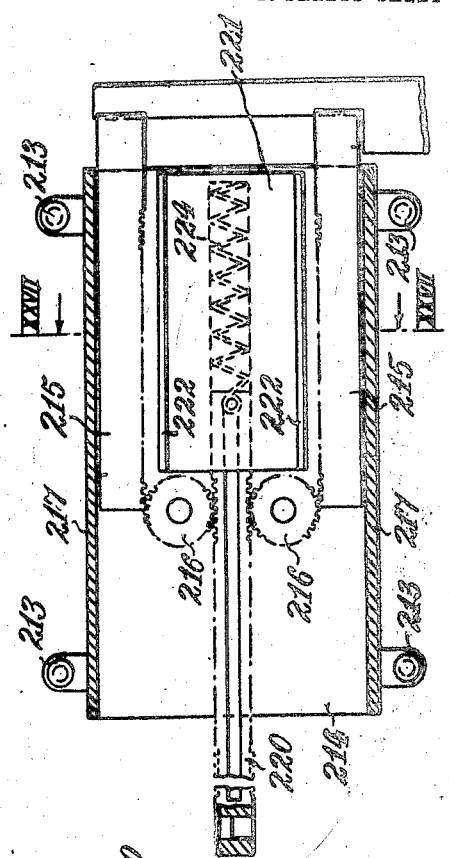
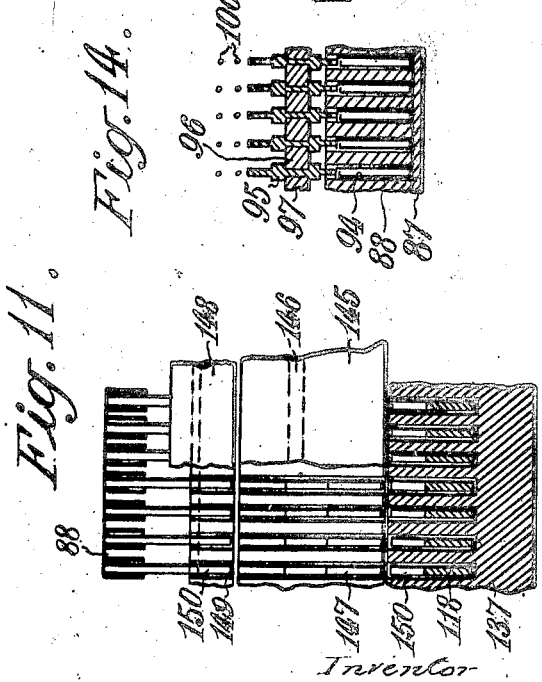

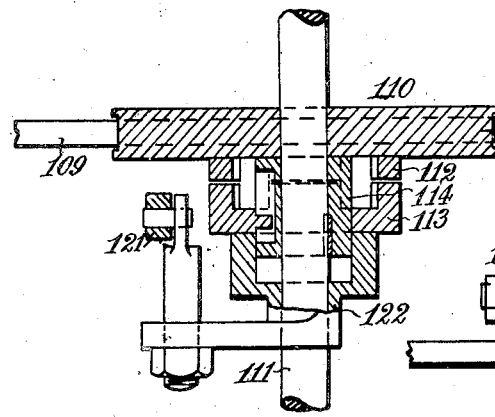

A. W. RANGER.
TYPE SETTING AND DISTRIBUTING MACHINE.
APPLICATION FILED DEC. 13, 1913.
1,103,013.
Patented July 7, 1914.
10 SHEETS—SHEET 8.
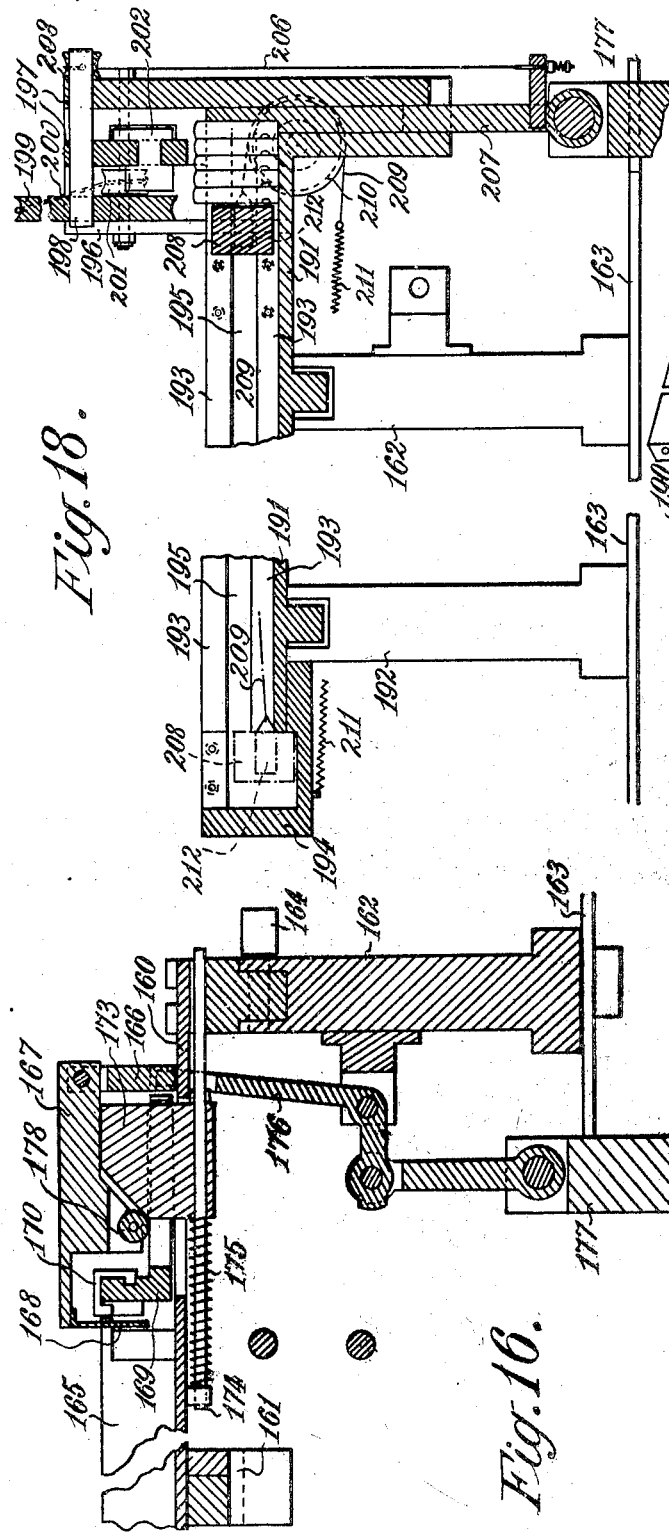
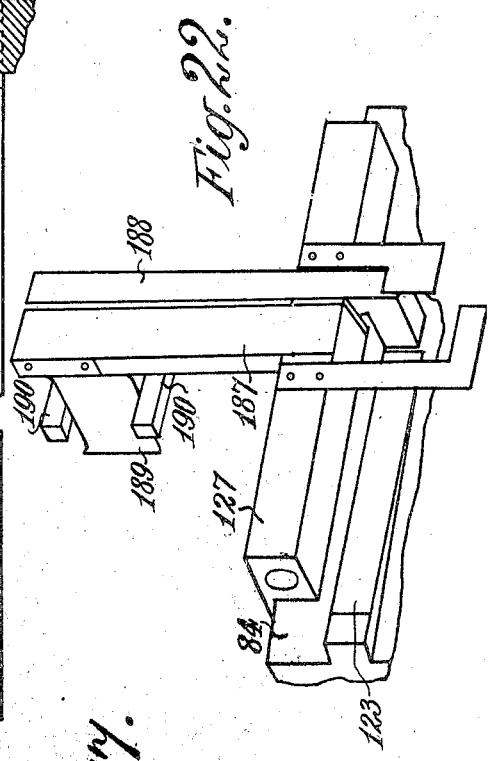
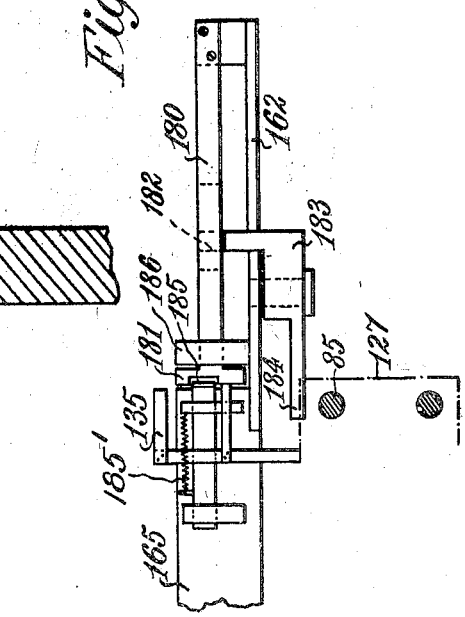

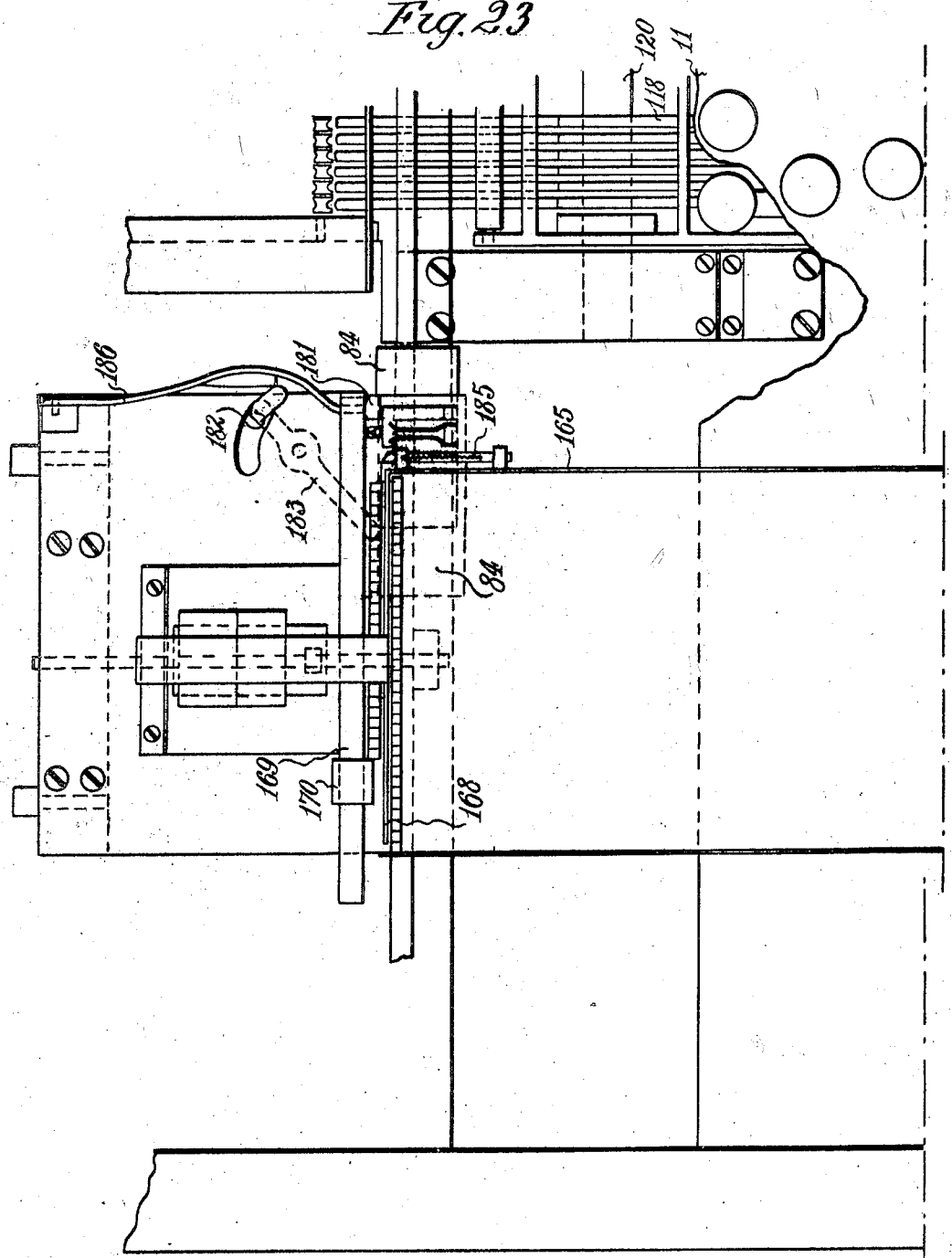

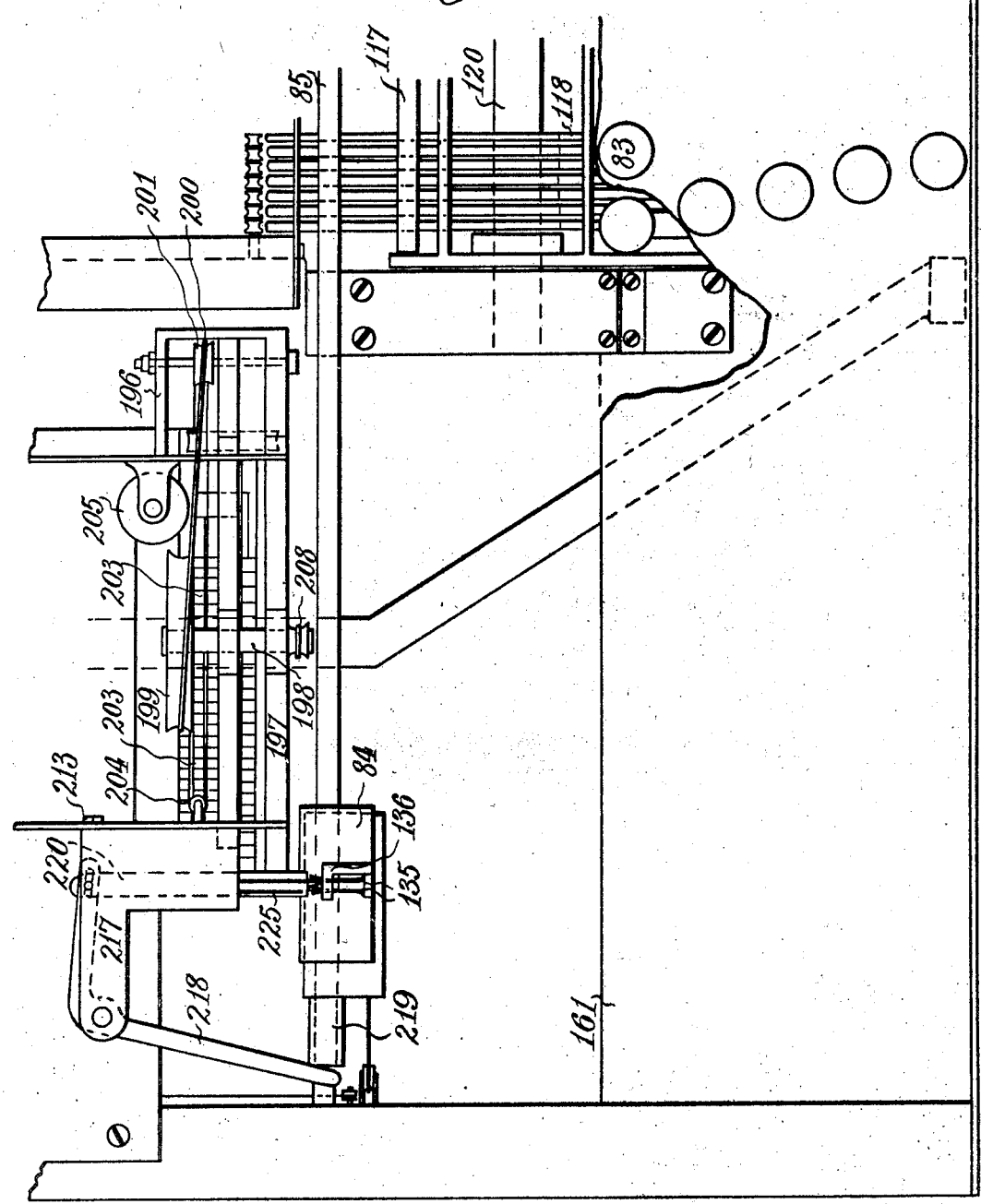

UNITED STATES PATENT OFFICE.

ARTHUR WILLARD RANGER, OF LONDON, ENGLAND.

TYPE SETTING AND DISTRIBUTING MACHINE.

1,103,013.  Specification of Letters Patent.  Patented July 7, 1914.

Application filed December 13, 1913. Serial No. 806,434.

*To all whom it may concern:*

Be it known that I, ARTHUR WILLARD RANGER, a subject of His Majesty the King of England, residing at 135 Tylecroft road, Norbury, in the county of London, Kingdom of England, have invented a certain new and useful Improvement in Type Setting and Distributing Machines, of which the following is a specification.

This invention relates to type setting or distributing machines in which a selector, such as a carriage, travels between a type magazine and a line to be composed, taking type from the one and giving it to the other according to the function of the machine, and having means controlled by the depression of a key for insuring the correct registration of the selector with the appropriate channel of the magazine. In this type of machine either the type are nicked for distributing purposes and thereby seriously weakened or during some portion of its motion the type is not under strict control but is allowed to fall freely or to have some similar motion, liable to cause damage to the types.

For the simpler class of composing machines required in connection with duplicators the selector is, according to the present invention, itself a line holder mounted upon a column rotated by depression of any key. As a rule this class of machines does not need to provide for distributing the type on account of their cheapness. On the other hand when founder's type has to be dealt with it is convenient to have a machine which with the minimum of alteration can be used either for composing or distributing. This is provided according to the present invention by mounting alternative selecting devices upon a carriage and by the use of alternative composing and distributing galleys, the mechanism of which is actuated by the carriage. Conveniently the selecting devices proper are mounted upon an auxiliary carriage supported on a main carriage, the selector being operated to receive or deposit a type by relative movement of the main and auxiliary carriages. The types employed are not weakened by nicks or the like and yet during the whole of the operations of composing and distributing, the types instead of being allowed to fall freely are secured from damage by being securely held during their whole motion.

The invention is illustrated in the accompanying drawings, in which:—Figure 1 is an end elevation. Fig. 2 is a plan of a machine intended for composing ordinary founder's type, and also for distributing the same. Figs. 3 and 4 are plan views, on a larger scale, of the ends of the keyboard and associated mechanism of this machine, the latter showing the distributing galley in position. Fig. 5 is a cross section of the keyboard and mechanism substantially on the line XIV—XIV of Fig. 3. Fig. 6 is an isometric view of the carriage of the type selector with type selecting devices upon it. Fig. 7 is a side elevation of this carriage and selecting mechanism. Fig. 8 is a sectional plan on the line XVII—XVII of Fig. 7. Fig. 9 is a sectional plan on the line XVIII—XVIII of Fig. 7. Fig. 10 is a simple plan of the carriage and selector. Fig. 11 is a section on the line XX—XX of Fig. 5, showing the mouth of the magazine channels and associated mechanism. Fig. 12 is a section on the line XXI—XXI of Fig. 3. Fig. 13 is a cross section of one edge of the magazine and its supports on the line XXII—XXII of Fig. 1. Fig. 14 is a cross section of a magazine on the line XXIII—XXIII of Fig. 5. Fig. 15 is a plan and Fig. 16 a cross section on the line XXV—XXV of Fig. 15, of the galley and associate mechanism used in composing. Fig. 17 is an elevation of the portion of this mechanism viewed from the left hand side. Fig. 18 is a cross section on the line XXVII—XXVII of Fig. 4, of the galley and associate mechanism used in distributing. Fig. 19 is a cross section on the line XXVIII—XXVIII of Fig. 4 or Fig. 20, of another portion of this mechanism. Fig. 20 is a section of the same portion of the mechanism on the line XXIX—XXIX of Fig. 4. Fig. 21 is a plan of this mechanism with its upper plate removed. Fig. 22 is an isometric view of a portion of the carriage showing the parts for distributing, in position upon it. Fig. 23 is a plan view of the machine, showing the magazine and composing galley in their relation, one to the other. Fig. 24 is a plan view of a portion of the machine showing the follower in act of pressing the lifted type over the wall of the galley.

Founder's type are so much more expensive than the type hitherto dealt with that it is necessary to distribute them and therefore desirable that the composing machine shall also be capable of the function of distributing. A machine designed to serve these two purposes is illustrated in Figs. 1 to 22. Briefly this machine comprises (see Figs. 1 to 5) a main frame 80 supporting a magazine 81 and provided with a forward and lateral extension 82 which supports a set of keys 83 as well as a galley either for composing or distributing. The keys 83 by the mechnism to be described hereinafter cause the movement of a carriage 84 along guides 85 in front of the magazine 81. In composing, mechanism upon the carriage receives a type which is caused by the action of a key to be ejected and the carriage then returns to the left hand side of the machine where the type is automatically released and packed into a line in the galley. In distributing a type is taken by mechanism on the carriage from the line to be distributed and the depression of the appropriate key 83 then brings the carriage opposite the corresponding magazine channel into which the type is pushed.

The type magazine, as may be seen from Fig. 13 consists of two side members 86 joined by a bottom plate 87 upon which are erected a number of thin division walls 88 separating the various channels of the magazine. The members 86 rest upon bars 89 one on either side of the machine joined by cross stays 90, and these bars are pivoted at 91 upon the main frame 80 and at the opposite end are supported by struts 92, the lower ends of which can move in slots 93 in a member of the main frame 80.

In each channel to support the type as they are pushed into it during distribution there is provided a spring follower 94 which engages frictionally against the sides of the channel. Behind this follower in order to feed the type formed during composing, there is provided another follower in the shape of a solid block 95 sliding upon one bar 96 of a grid of bars which are united at the back and front of the machine by cross-bars 97. Each follower 95 is drawn forward by any suitable mechanism, for example by a spring 98 which through a pulley block 99 tensions a cord 100 fastened to the cross bar 97 and to the follower 95. The bars 97 have beneath them feet 101 which rest upon the top of the magazine and so hold the grid 96 a short distance above the magazine. In the space between the two there slides a cross slat 102 which has a cord 103 at each end of it fastened to pulleys 104 at the back of the machine which are fast upon a shaft 105 rotatable by means of a small crank handle 106.

The purpose of the slat 102 is to enable the spring followers 95 to be put out of action during distributing. By rotation of the crank handle 106 the slat is drawn back and carries all the followers with it against the action of their springs. The crank 106 is fastened by any suitable catch when the followers are thus wound back.

It will be noted that the followers 95 do not extend to the bottom of the magazine channels. Nevertheless in order that a magazine may be withdrawn it requires to be lowered to some extent so that the type in it may pass the follower. It is for this purpose that the magazine is supported on the pivoted members 89 which can be lowered by moving the struts 92 into a slanting position.

As this machine is designed to perform a comparatively large number of operations automatically it is desirable but not necessary that the power for performing these operations should be obtained from a mechanically driven shaft and not merely from the depression of the key. With this intent the carriage 84 is normally drawn toward the left hand side of the machine by a cord 107 attached at one end to a spring drum 180 secured in supports depending from the main frame and at the other end to the carriage itself, the cord passing over suitable guide pulleys 230 and 231 to direct its course. Its motion in the opposite direction is brought about by means of a flexible band 109 (Fig. 11) fastened to the carriage and also fastened to a horizontal pulley 110 at the right hand side of the machine. As may be seen from Fig. 21 this pulley rotates loosely upon a vertical shaft 111 which is continuously driven by any suitable motor, not shown. Upon its under side the pulley carries clutch teeth 112 which can engage with a clutch member 113 slidable on, but not rotatable relatively to, a sleeve 114 fast upon the shaft 111. This member is normally pressed downward by a spring, not shown, surrounding the shaft. As this clutch has to be put into operation upon the depression of any key whatever it is controlled by the following mechanism shown particularly in Fig. 14. A common frame 115 pivoted at the two ends of the machine at 116 carries at its free end a roller 117 resting upon all the key levers 118 each of which can be operated by one of the keys 83. Certain of these key levers engaging with the rear key stems are recessed at 119 in order that the extent of motion of all the keys may be substantially the same although they engage with their levers at different distances from the common pivot 120. To the pivot of the frame 115 beyond its right hand bearing is attached an arm 121 which through a link, and a sleeve 122 supports the clutch member 113.

It will be seen that if any key is depressed the frame 115 will be raised, with the result that the clutch member 113 will be lifted into engagement with the clutch teeth 112 and the pulley 110 will be rotated by the driving shaft 111.

The construction of the carriage 84, which is thus reciprocated upon the guides 85 upon the depression of a key, may be gathered from Figs. 15 to 19. The portion 84 to which the wire 107 and band 109 are attached has on its front face certain wedge surfaces 123, 124, 125 and 126, the function of which will appear hereinafter. The carriage is largely surrounded by an outer member or auxiliary carriage 127 which is connected with the main carriage by springs 128 engaging between a central projection 129 on the member 127 and straps 130 fastened on the member 84. These springs tend to keep the auxiliary carriage in central position upon the main carriage to permit of its displacement. The auxiliary carriage supports the mechanism by which type is selected from a magazine or from a line to be distributed, as the case may be. It is to be noted that different mechanism is required for these two purposes. The figures above referred to show the mechanism for selecting from a magazine, i. e. mechanism required for composing. This comprises two vertical arms 131, 132 pivoted upon rod 133 in the member 127. The lower ends of these vertical arms are shaped and are positioned to engage respectively with the wedge surfaces 124 and 125 and are pressed against these surfaces by springs 134. At its upper end the arm 131 carries two pairs of springs 135 splayed at their extreme outer ends to receive a type. Between the two pairs of springs there extends an L-shaped member 136 fast upon the upper end of the arm 132.

It will be clear that if the auxiliary carriage 127 moves to the left relatively to the main carriage 84 the bottom of the arm 131 will ride up on the wedge 124 and so will tilt the springs 135 toward the back of the machine that is toward the magazine. When, on the contrary the auxiliary carriage 127 moves to the right relatively to the main carriage, the lower end of arm 132 will ride upon the wedge surface 125, with the result that the L-shaped portion 136 will be thrust forward between the pairs of springs 135 and will push out from them any type that they may be holding.

In order that the carriage 84 may be stopped opposite the magazine channel corresponding to the key which caused it to begin moving, the end of the key lever which moves in a vertical slot in a block 137 is provided with an upward extension 138 (Fig. 14) which when the key is depressed is projected into the path of the surface 139 of the auxiliary carriage 127. This stop 138, however projects beyond the surface 139 toward the front of the machine so that it can subsequently be engaged by the wedge surface 126 (Fig. 15) as hereinafter explained. The key lever 118 also carries a second upstanding projection 140 the function of which is to provide for extrusion of the type. The side walls 86 of the magazine have at their front ends downwardly extending portions 141 between which is fastened a bar 142 which is divided by vertical slots, only a triangular portion as indicated in Fig. 14 remaining solid. Beneath this bar 142 there is pivoted to the main frame at 143 an upstanding bar 144 which is similarly slotted from its front face so as to present a sort of comb with long teeth. The front of this comb is closed by a plate 145 which has an inward projection 146. This engages a slot in a loose sliding member 147 arranged between each pair of teeth of the comb 144. There is also attached to the front of the magazine a plate 148 which extends to a short distance above the base of the magazine just sufficient to keep the type from falling out. In each groove in the block 142 there lies a flat spring 149 fastened to the bottom of the magazine at its rear end and supporting at its front end a pusher 150 which extends up just in front of the front edge of the bottom 87 of the magazine. The partitions 88 of the magazine extend at the top but not at the bottom beyond the front edge of the bottom plate 87 as indicated in Fig. 14.

When a key 83 is depressed the projection 140 on its lever 118 raises the member 147 and this in turn lifts the member 150 which is attached to the leaf spring 149. In its lower position the upper surface of the member 150 forms practically a continuation of the floor of the magazine channel. Its width is substantially equal to the depth of the type and as the type are pushed forward by their spring-pressed followers 95 toward the front plate 148 the end type in each magazine channel will come to rest upon the member 150. Consequently when this member is lifted it lifts the end type to substantially the level of the upper edge of the plate 148. The type is not yet extruded, however, for the member 150 is itself interposed between the plate 148 and the next type and so prevents any forward motion of the spring pressed follower 95. But when the auxiliary carriage 127 is stopped by the engagement of the upward projection 138 on the type lever with its surface 139, the carriage proper 84 to which the strap 109 is connected will continue its motion. One result of this is to cause the wedge surface 126 to ride over the projection 138 and depress the projection and therefore the key lever 118. This permits the frame 115 to fall so permitting the clutch 113 to come out of action. But the fall of the projection 140 permits the member 150 to fall with the result that the end type is now pushed forward over the front plate 148 by the spring-pressed follower 95. The keys 83 are lifted to their full height by springs, not shown, around their stems. At the same instant, however, the relative motion of the auxiliary carriage 127 and the main carriage 84 has by the action of the wedge surface 124 above described caused springs 135 at the top of the arm 131 to be thrown forward into close proximity to the end of the magazine channel so that they are precisely in position to receive the end type when it is thus thrust out of the channel.

The type desired having been thus selected and taken out of its magazine, it remains to associate it with others in the line thus being composed. This is done by the mechanism shown in Figs. 15–17. The base plate 160 of the composing galley rests upon the left hand end of the upper plate 161 through which the key stems pass and upon an upright wall 162 erected on a plate 163 secured to the top of the rear portion of the left hand lateral extension of the main frame. To insure correct positioning the base 160 carries blocks which fit the one between blocks on the plate 161 and the other in a recess on the top of the wall 162 as shown. It is secured in position by suitable pins 164. The base plate 160 extends beyond the side walls 165 of the galley and on the extended portion is erected a bracket 166 on which is pivoted an arm 167 carrying a gate 168. Beneath this arm 167 is a slotted plate 169 the elevated front portion of which forms a guide for a follower 170 which is attached by a cord 171 to a spring drum 172 so as to be constantly drawn toward the right. This slotted plate is kept in central position by a block 173 which protrudes through it and through a slot in the base 160 and slides upon a rod 174 beneath the base. It is normally pressed to the rear by a spring 175 but can be forced in the opposite direction by a bell crank lever 176 connected by a pitman 177 to a pedal, not shown, which is spring pressed into the upper position. The upper surface of the block 173 is beveled in its front half to engage a roller 178 pivoted in the arm 167 so as to raise said arm when it moves.

A flat spring 180 is fastened upon the upper surface of the base plate 160 and this spring carries at its end a hammer-head 181 and in the middle of its length is an abutment. This coöperates with the upstanding end 182 of a lever 183 pivoted below the base plate through a slot in which this upstanding end protrudes. The tail end 184 of this lever is in close proximity to the upper guide 85 of the carriage and forms a stop limiting the motion of the auxiliary carriage. The hammer-head 181 is slotted in its front surface to receive the end of a stop 185 supported in brackets on the side wall 165 of the galley which stop 185 is upwardly impelled by a spring 185'. All this mechanism at the right hand side of the galley, with the exception of the spring-drum 172, is shown isolated in Fig. 17. There is a fixed wall 186 erected on the right hand side of the base plate in line with the rear position of the guide on the plate 169. This wall is slotted for the passage of the spring 180.

Since the motion of the auxiliary carriage 127 relatively to the main carriage 84 has through the operation of the wedge surface 126 caused the projection 138 which stopped the carriage to be depressed and the driving clutch to be taken out of action, the carriage is free to return to its left hand position under the action of the spring drum 108 and the cord 107. On so returning the auxiliary carriage strikes the end of lever 183 so causing its head 182 to move to the right and to move the hammer 181 beyond the position which the springs 135 of the carrier take up. But as it is only the auxiliary carriage which is stopped, the main carriage 84 will move a little farther, with the result that its wedge surface 125 will engage the lower end of the member 132 thrusting its upper L-shaped portion 136 forward and so pushing the selected type out from the springs. The type is then left standing on the base plate of the galley but just outside the side wall 165 of the galley. As soon as the next key is depressed the carriage travels away again so that lever 183 is released and the spring 180 can move to the left. In so moving its hammer-head thrusts a type to the left past the slightly beveled end of the spring-pressed stop 185 and between the gate 168 and the guide 169. This movement of the spring 180 pushes the follower 170 a step farther to the left. It will be seen that the stop 185 serves to support the end type in the line while the hammer 181 is pushed to the right by the carriage acting on the lever 183, as in Fig. 23. This action continues until the line is filled with type so that the follower 170 is at the extreme left hand edge as indicated in Fig. 15. The operator then depresses the pedal connected with pitman 177 so thrusting forward the block 173. This first lifts the gate 168 and immediately thereafter encountering the end of the slotted member 169 forces this member bodily forward. This carries the type with it to a position just beyond the gate. It will be noted that the edge of the follower 170 is beveled so that it will pass outside the left hand wall 165 of the galley (see Fig. 15) during this movement. When the pedal is released the spring 175 returns the block 173 which withdraws the plate 169 and immediately lets the gate 168 fall behind the line of type thus pushed into the galley. The follower 170 returns under the action of its spring drum 172 to the right hand end of the line and the process of packing type above described can recommence.

If it is desired to employ the machine for distributing instead of for composing, the composing galley and its mechanism is wholly removed, i. e. the plate 160 with all attached to it is taken away and so also is the bell crank lever 176. At the magazine the block 144 is turned backward on its pivots so as to break the connection between the key levers and the lifters 150, and the followers are withdrawn as above described by means of the slat 102. Also the members 131, 132 are removed from the auxiliary carriage 127 by withdrawing their pivot 133, and in their place are fastened two members 187 and 188 (see Fig. 22). The former has a squared lower end engaging with the carriage 127 so that it cannot rock about its pivot. But the latter is movable like the members 131, 132 its lower end being shaped and in position to engage with the wedge surface 123 upon the carriage 84. At its upper end the member 187 carries two broad flat springs 189 splayed at their free ends to receive a type and the member 188 carries two L-shaped pieces 190 above and below those springs in position to eject a type from them.

The distributing galley which has to be attached to the machine in the stead of the composing galley removed, is shown in Figs. 18–20 as well as in Fig. 4. It will be noted that it does not occupy precisely the same position in the machine as the composing galley, for while the latter projected toward the front and had its mechanism at the rear end, the distributing galley has its mechanism at its front end and projects toward the back, its mechanism, however, occupying substantially the same position as the mechanism of the composing galley. The base plate 191 of the distributing galley carries blocks like those on the base plate of the composing galley which fit in recesses in the wall 162 and in the second wall 192 erected on the plate 163 farther toward the rear. The side walls 193 of the galley are slotted, the upper strip being attached to the lower end of the base 191 at the rear end only by an end casting 194 at the back which is fastened to the end of the plate 191. Near the front of the galley on the right hand side there is fastened to the side wall 193 an upstanding three-sided inclosing bracket 196, which is also fastened to an upward extension of the side wall 193 at the front. Both side walls 193 of the galley are thus extended upwardly at their front ends as shown in Fig. 18 and between them are fastened two downwardly depending plates 197. In the middle of their length these plates 197 support a shaft 198 which carries at its rear end a pulley 199. To this is secured a wire 200 which passes over a pulley 201 supported in the three-sided bracket 196 and is attached to a follower 202 which slides in a slot in the rear plate 197 and in a continuation of that plate which is supported in the bracket 196. There is also attached to this follower a cord 203 passing around a pulley 204 at the left hand side of the galley and attached to a spring drum 205. The pulley 199 may be rotated by means of a cord 206 which is attached at its lower end to a sliding plate 207 and at its upper end to a small pulley 208 on the shaft 198. The sliding plate 207 moves between the front plate 197 and a downwardly turned portion of the base plate 191 of the galley. It is recessed along its top to form a shoulder upon which the end line of type can stand. Its bottom end is pivoted to the pitman 177. The type are pressed up toward the shoulder of the plate 207 by a follower 208 which is drawn forward by a cord 209 passing over a pulley 210 and fastened to a spring 211 attached at the rear end of the galley. The follower 208 has reduced ends 212 which project through the slots in the side walls 193 the front edge of this reduced portion projecting forwardly and being beveled. When it is desired to place type in the galley for distributing the follower 208 can be drawn back and dropped behind the end of the base plate 191 into the rear casting 194, being restored to its normal position when the type are in place.

It will be seen from Fig. 18 that when the type are standing on the base plate 191 of the galley they are below the path of the follower 202. But as soon as one line has been distributed the operator depresses the pedal to which the pitman 177 is attached with the result that a fresh line of type is pushed on to the shoulder of the plate 207, and when the pedal is released this line of type is pressed upward into a position in which the follower can engage the type. In Fig. 18 the pitman is shown in its depressed position. The same depression by drawing down the cord 206 rotates the pulley 199 and draws the follower 202 to the right hand side of the galley in position to engage behind the line of type about to be lifted.

Upon the left hand side of the galley there is fastened by screws 213 a block 214 seen in further details in Figs. 19 and 20. Sliding in slots in this block are rack members 215, the rack teeth facing toward each other and engaging cog wheels 216, the pivots of which have bearings in the block 214. Above and below the block 214 are cover plates 217 which are extended laterally at their rear end to support the pivot of a lever 218, one end of which rests against a sleeve 219 sliding on the upper guide 85 of the carriage. The tail end of this lever is slotted and engages a pin upon a third rack member 220 which has teeth on either side of it to engage with the respective pinions 216. This rack slides in a rectangular opening in a block 221 which has extensions 222 sliding in slots in a plate 223 secured between the cover plates 217 parallel to the face of the block 214. There is a spring 224 in this rectangular opening pressing against the rack 220. This latter is slotted at 220ª and engages over a pin 220ᵇ fastened transversely in the opening. The forward ends of the racks 215 are beveled on one side as may be seen from Fig. 21 and are slightly recessed on the opposite side at 215ª for a reason which is explained hereinafter. To the side of the plate 223 there are fastened leaf springs 225 which pass through slots in the plate 223 and lie close against the beveled surfaces of the racks 215, their extreme free ends being bent parallel to the face of the block 214.

When the carriage 84 returns empty from carrying a type to its magazine in the operation of distributing it moves farther to the left than when composing and strikes the sleeve 219 so rocking the lever 218 upon its pivot. The rack member is therefore thrust forward and its action through the pinions 216 causes the rack 215 to be withdrawn. At first the rack 220 pushes before it through the spring 224 the block 221 until this latter strikes the edge of the end type in an uplifted line resting on the plate 207. Since the face of the rack 15 adjacent the line is slightly recessed as above mentioned, and as indicated in Fig. 21, the follower 202 is able to press the lifted type over the wall of the galley and along between the block 214 and an extension of the front plate 197 until its edge protrudes slightly into the path of the block 221 which it thus stops. In the further forward motion of the rack 220 the spring 224 is compressed but its further movement finally withdraws the racks 215 so far that they no longer support the end type, which accordingly is pressed outward against the flat springs 225. As soon as the type is clear of the plate 197 the block 221 pressed forward by its spring 224 forces the type into the springs 189 of the carrier which are in position to receive it. To insure the exact positioning of these springs a stop, not shown, is provided to engage with the auxiliary carriage. The operator then pressed the key of the character which the type bears and by the action of the clutch mechanism heretofore described the carriage immediately moves away to the magazine channel of that particular character. When it thus moves away the lever 218 is free to turn back to its initial position into which it is pressed by the spring 224 and by a spring not shown acting on the member 221. As this latter recedes so as to leave the end type again free the rack members 215 are thrust forward and prevent the end type emerging except to a small extent.

When the carriage 84 reaches the appropriate magazine channel the auxiliary carriage 127 is stopped by the up-turned end of the key lever as before described, but the carriage 84 moves a little farther under the action of the tensioning of the band 109. In this relative movement of the carriage and auxiliary carriage the wedge surface 123 on the former engages the abutment of the member 188 and therefore thrusts forward the L-shaped parts 190 at its upper end. These push the type out from the springs 189 between the partition walls of the magazine channel with which they are in exact register, the latter being preferably beveled to facilitate the entry of the type. This succession of operations is repeated until a complete line of type is disposed of, when the follower 202 will be at the extreme left hand end of the line. The operator then depresses the pedal, drawing down the plate 207 and withdrawing the follower to the right hand end. When the pedal is released a fresh line is lifted and the follower again comes into action to feed it type by type into the path of the block 221.

To provide for the justifying of the line there may be provided on the machine a counter which is operated by a spacing bar on the completion of every word so that it indicates the number of spaces required in the line. There may be the usual bell signal employed on typewriters to indicate when the line is filled within a given distance of the end. On nearing the end the operator knowing the amount of space left at the end of the line and the number of words in the line, can estimate the thickness of space required for justifying. He then depresses the key corresponding to the thickness of space as many times as there are spaces so that the number of spaces requisite for justifying are packed beside the type at the end of the line.

In place of the continuously driven shaft with the clutch mechanism above described, the carrier may be operated by an electric motor, the keys being fastened to close the circuit of this motor during a given number of revolutions so that the motor operating through gearing may carry the type selector over a desired distance.

It will further be understood that the general notion of a type selector rotating about a center may be employed in connection with the composing of founders' type as well as for the small type for which the machines first above described are intended.

What I claim as my invention and desire to secure by Letters Patent of the United States is:—

1. In a type setting or distributing machine comprising a magazine, a key operated carriage movable between the said magazine and an assembled line of type, an auxiliary carriage supported on the main carriage, a selector mounted on the said auxiliary carriage and means whereby said selector is operated to receive or deposit a type by relative movement of the main and auxiliary carriages.

2. A type setting machine comprising a common pivoted frame, a keyboard, type magazines, a type selector, means for moving said selector into relation with the channels of the magazine upon the operation of any key, means for stopping said selector in register with the channel corresponding to the key operated in which the depression of any key swings said common pivoted frame, which causes the movement of the selector, a series of loose sliding members and a pivoted frame carrying the same, the arrangement being such that during composing the motion of the key levers is transmitted to the first type in the magazine channels by said series of loose sliding members carried in said pivoted frame which can be swung out of operative position when it is desired to employ the machine for distributing.

3. In a machine for composing and distributing type comprising a keyboard, type magazines, a type selector and a carriage movable between an assembled line and the channels of the type magazine, a distributing galley in which the moving selector operates and a plunger by which the end type is pushed into the said selector, substantially as described.

In testimony whereof I have signed this specification in the presence of two subscribing witnesses.

ARTHUR WILLARD RANGER.

Witnesses:
J. F. ARTNECK,
FRANK BLAKEY.